United States Patent [19]

Dimaio

[11] Patent Number: 4,834,405
[45] Date of Patent: May 30, 1989

[54] BICYCLE SUPPORT STAND

[76] Inventor: James V. Dimaio, 26546 Calle San Francisco, San Juan Capistrano, Calif. 92675

[21] Appl. No.: 67,959

[22] Filed: Jun. 29, 1987

[51] Int. Cl.[4] .............................................. B62H 1/02
[52] U.S. Cl. ..................................... 280/301; 70/235; 211/22
[58] Field of Search ............... 280/293, 295, 296, 297, 280/298, 301, 302, 303; 211/22, 17; 70/235

[56] References Cited

U.S. PATENT DOCUMENTS

| 531,338 | 12/1894 | Schloer | 280/301 |
|---|---|---|---|
| 602,318 | 4/1898 | Geidt | 280/301 |
| 607,779 | 7/1898 | Welch et al. | 280/301 |
| 626,239 | 6/1899 | Lindstrom . | |
| 862,768 | 8/1907 | Stiles . | |
| 2,455,312 | 11/1948 | Mueller | 280/301 |
| 2,553,466 | 5/1951 | Morgan | 280/301 |
| 2,685,452 | 8/1954 | Atwood | 280/301 |
| 2,912,255 | 11/1959 | Hahn | 280/301 |
| 3,376,049 | 4/1968 | Gordon | 280/301 |

FOREIGN PATENT DOCUMENTS

| 50012 | 3/1935 | Denmark . | |
|---|---|---|---|
| 53532 | 8/1937 | Denmark . | |
| 2721180 | 11/1978 | Fed. Rep. of Germany | 280/296 |
| 310068 | 3/1932 | Italy . | |
| 209486 | 4/1940 | Sweden | 280/293 |
| 27708 | of 1898 | United Kingdom . | |
| 20637 | of 1901 | United Kingdom . | |
| 12495 | of 1903 | United Kingdom . | |

Primary Examiner—Charles A. Marmor
Assistant Examiner—Everett G. Diederiks, Jr.
Attorney, Agent, or Firm—Lynn & Lynn

[57] ABSTRACT

A support member is rotatably fastened to a bracket that is configured for mounting to a bicycle seat tube just above the bottom bracket. The support member is movable between a stored position where it is generally parallel to and just behind the seat tube and a lower position to support the weight of the bicycle. A locking mechanism includes an X-shaped recess in a head of the support member and a pair of detents in the bracket. The detents extend from a projection that is flexibly connected to the bracket. The projection bends slightly to permit movement of the support member between positions.

6 Claims, 3 Drawing Sheets

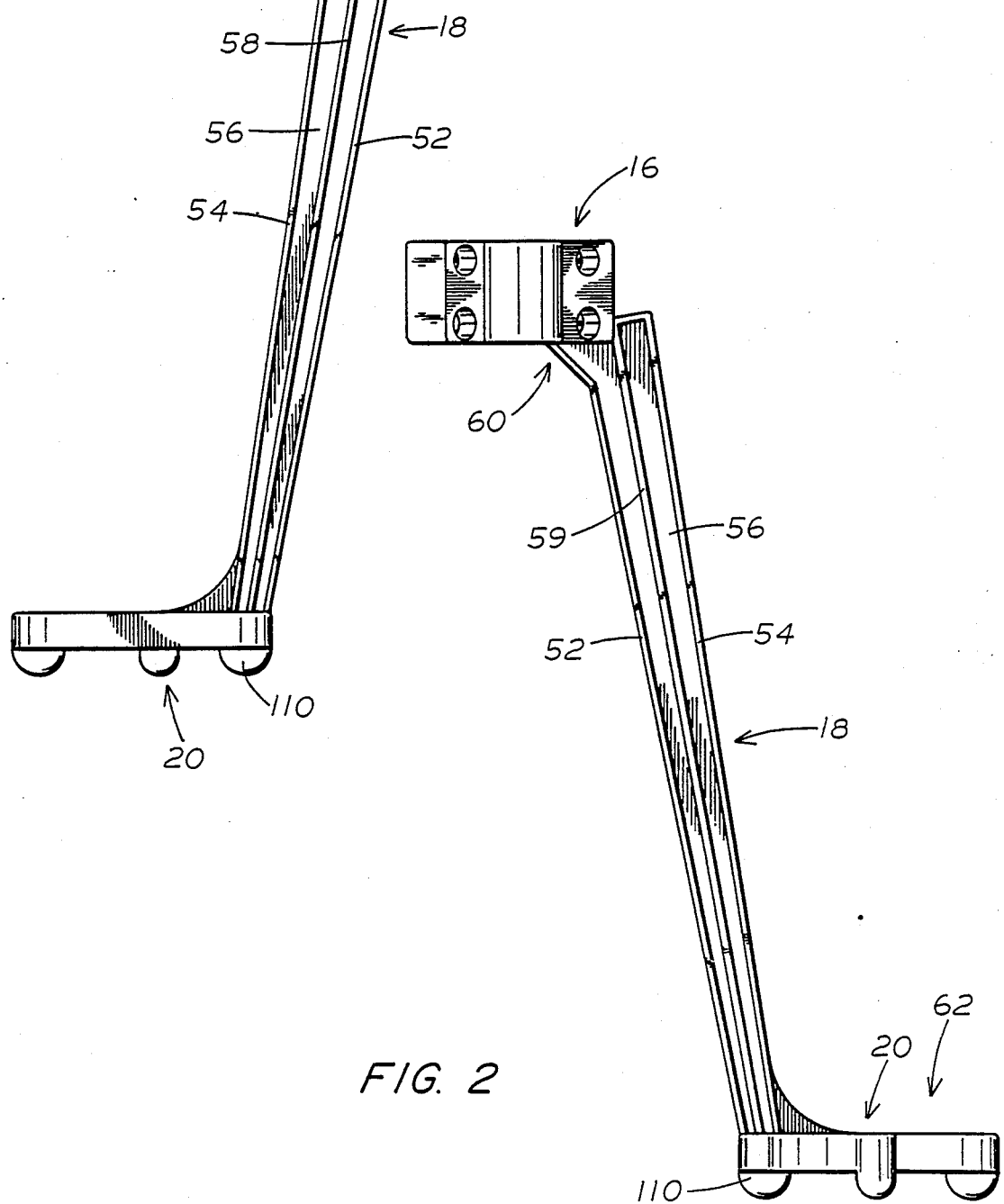

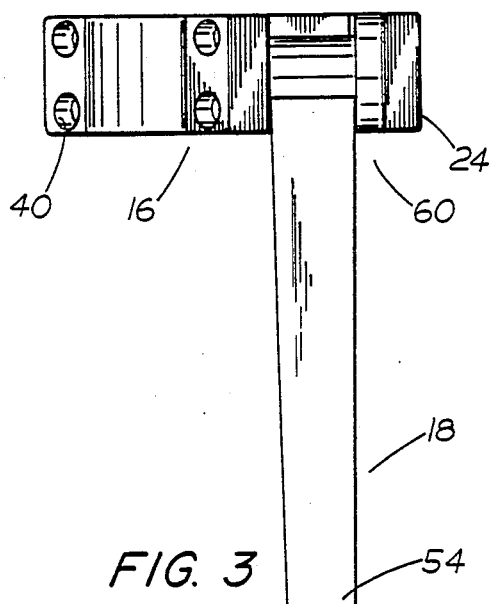
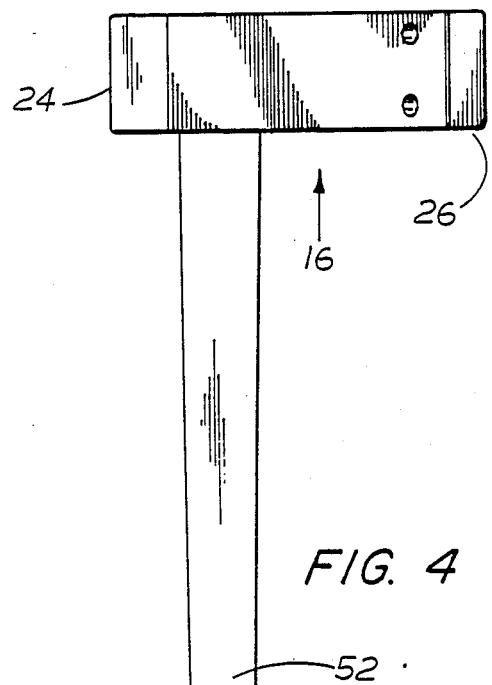
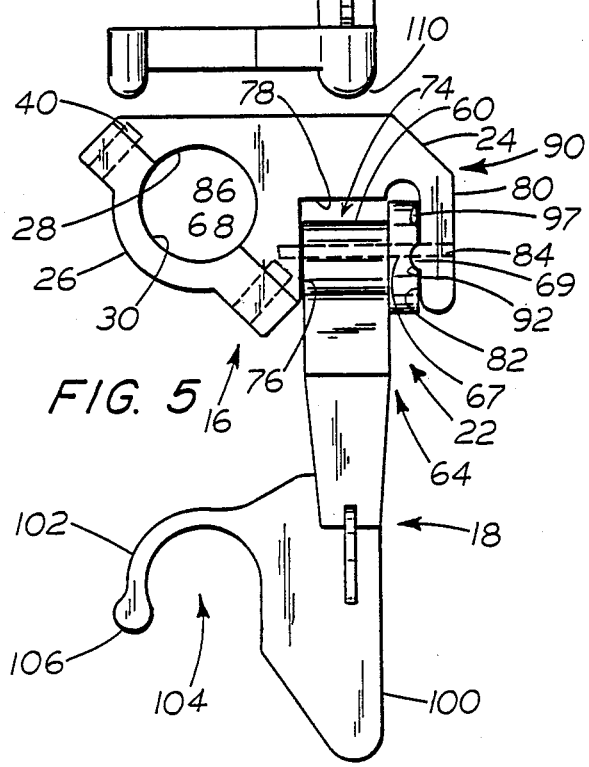
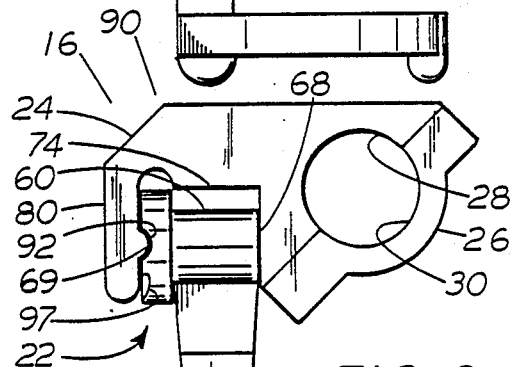
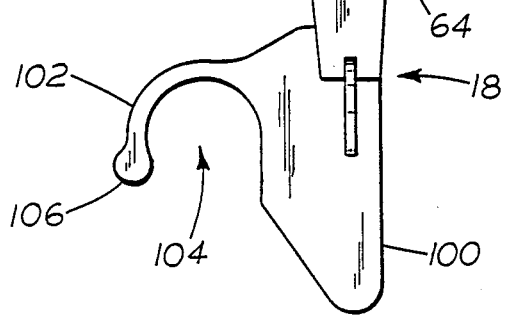
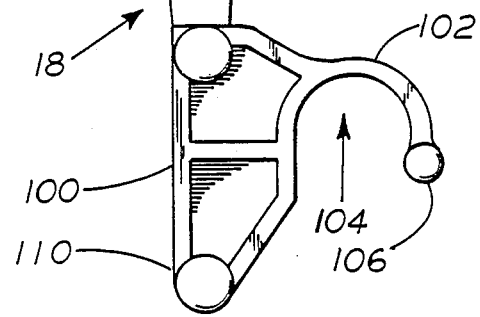

BICYCLE SUPPORT STAND

BACKGROUND OF THE INVENTION

This invention relates generally to a support stand for a bicycle or the like. This invention relates particularly to a support stand that attaches to the seat tube of a bicycle.

There is a need in the art for an improved bicycle support stand. The commonly used bicycle support stands attach to the bicycle frame behind the bottom bracket. These stands are often called kick stands because a person may use his foot to move the support member of a kick stand into position to support a bicycle or to rotate it to a position where it should not interfere with operation of the bicycle.

On certain modern bicycles it has been found advantageous to mount the rear brakes to the frame behind the bottom bracket where the kick stand ordinarily would be mounted. This location for attaching brakes provides superior braking performance than other locations. Therefore the common kick stand is unsuitable for use with a bicycle having the rear brake mounted just behind the bottom bracket.

SUMMARY OF THE INVENTION

The present invention provides a support stand that is suitable for use with all types of bicycles and that is particularly suitable for use with a bicycle having the rear brake mounted just behind the bottom bracket. The bicycle support stand according to the present invention is readily formed by molding using plastic or a metal such as aluminum.

The bicycle support and according to the present invention comprises a mounting bracket configured for connection to a bicycle seat tube, a support member extending from the mounting bracket, the support member being rotatable upon the mounting bracket between a lower position to support the bicycle and an upper position in which the support member is generally parallel to the seat tube, and a hinging and locking device formed in the mounting bracket and a first end of the support member, the hinging and locking device including a first portion of the mounting bracket that is configured to define a recess, detent means extending from a portion of the mounting bracket into the recess; and a head portion extending from a first end of the support member, the head portion including means for engaging the detent means to retain the support member in either the upper or lower position.

The locking device includes a projection extending from the support bracket to define the recess. The projection is flexibly mounted to the support bracket so that the detent is retained in the detent engaging means when the support member supports the weight of the bicycle and so that the projection bends away from the support bracket upon the application of sufficient torque to the support member to disengage the detent from the detent engaging means when the support member is moved between the upper and lower positions.

The detent engaging means preferably comprises a generally X-shaped recess in a surface of the head of the support member and wherein the detent means includes a pair of detents extending from the projection into the recess in the mounting bracket for selective engagement in the X-shaped recess in the head of the support member.

The bicycle support stand according to the present invention may further comprise a foot extending from a second end of the support member, the foot preferably includes means for enclosing and gripping a portion of the seat tube when the support member is in its stored position. The foot preferably includes at least one stud extending from a lower surface thereof to retain the foot against sliding when the support member is in the lowered position.

The method according to the present invention for supporting a bicycle comprises the steps of connecting a mounting bracket to the seat tube of a bicycle near the bottom bracket of the bicycle frame, extending a support member from the mounting bracket, the support member being rotatable upon the mounting bracket between a lower position to support the bicycle and an upper position in which the support member is generally parallel to the seat tube, and forming a hinging and locking device in the mounting bracket and a first end of the support member, by the steps of configuring a first portion of the mounting bracket configured to define a recess, extending detent means from a portion of the mounting bracket into the recess, mounting a head portion formed on a first end of the support member in the recess, and forming the head or to include means for engaging the detent means to retain the support member in either the upper or lower position.

The method of the present invention preferably includes the steps of forming the locking device to include a projection extending from the support bracket to define the recess, and mounting the projection being flexibly to the support bracket so that the detent is retained in the detent engaging means when the support member supports the weight of the bicycle and so that the projection bends away from the support bracket upon the application of sufficient torque to the support member to disengage the detent from the detent engaging means when the support member is moved between the upper and lower positions.

The method of the invention may further include the steps of forming the detent engaging means to comprise a generally X-shaped recess in a surface of the head of the support member, and extending a pair of detents extending from the projection into the recess in the mounting bracket for selective engagement in the X-shaped recess in the head of the support member.

BRIEF DESCRIPTION OF THE DRAWINGS

FIG. 1 shows a bicycle support stand according to the present invention from a first side;

FIG. 2 shows the bicycle support stand of FIG. 1 from the side opposite that of FIG. 1;

FIG. 3 is a left side elevation view of the bicycle support stand of FIG. 1;

FIG. 4 is a right side elevation view of the bicycle support stand of FIG. 1;

FIG. 5 is a top plan view of the mounting bracket of FIG. 1 in showing a support arm in a lowered position;

FIG. 6 is a bottom plan view of the device of FIG. 5.

DESCRIPTION OF THE PREFERRED EMBODIMENT

Figure 7:
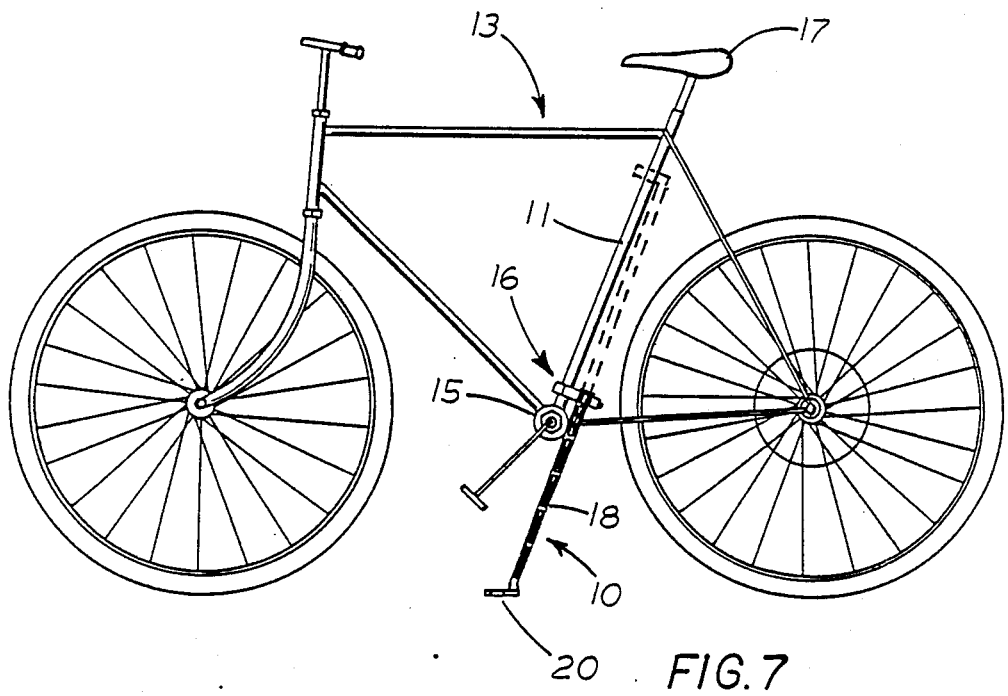
FIG. 7 illustrates the bicycle support stand according to the present invention attached to a bicycle frame having a bottom bracket and a seat tube.

Referring to FIGS. 1 and 7, a bicycle 8 includes a support stand 10 according to the present invention which is attached to a seat tube 11 of a type that is typically included in a bicycle 13. The seat tube 11 extends from a bottom bracket 15 and provides means for mounting a seat 17 to the bicycle 8. The bicycle support stand 10 includes a mounting bracket 16, a support member 18 having an upper end attached to the mounting bracket 16 and a foot 20 extending from the lower end of the support member 18.

The foot 20 may be moved to a position where it extends downward to the surface on which the bicycle rests. When the bicycle support stand 10 is in the position shown in FIG. 5, it prevents the bicycle from falling over on its side. The support member 18 may be rotated away from the position shown in FIG. 5 to a stored position in which the support membr 18 is generally parallel to the seat tube 11.

As described subsequently with reference to FIGS. 5 and 6, the bicycle support stand 10 includes a locking mechanism 22 that may be used to selectively retain the support member 18 in position to support the bicycle or to retain the support member 18 in its stored position parallel to the seat tube 11.

Referring to FIGS. 1-6, the mounting bracket 16 preferably includes a first portion 24 to which the support member 18 is connected and a second portion 26 which connects to the first portion to secure the mounting bracket 16 to the seat tube 11. The first bracket portion 24 includes a generally semicylindrical recess 28 therein, and the second bracket portion 26 includes a similar recess 30. When the first and second mounting bracket portions 24 and 26 are assembled together shown in FIGS. 5 and 6, the recesses 28 and 30 cooperate to form a generally cylindrical cavity. When the mounting bracket 16 is mounted on the seat tube 11, the tube fits inside the generally cylindrical cavity.

Referring to FIGS. 1-6, a plurality of bolts 32 extend through holes 36 in the second bracket portion 26 and into threaded holes 40 in the first bracket portion 24. The bolts 32 secure the first and second bracket portions 24 and 26 to the seat tube 11 with sufficient force to prevent the mounting bracket 16 from rotating or sliding on the seat tube.

The support member 18 may have any suitable shape that provides a sturdy support to the bicycle. Referring to FIGS. 1-4 the support member 18 may be formed generally as an I-beam having a pair of flat sides 52 and 54 joined by a web 56. The support member 18 may also include a pair of stiffener ribs 58 and 59 that extend from the web 56 between the sides 52 and 54. The configuration described above provides adequate support to the bicycle and is readily formed by molding using well-known techniques.

The support member 18 includes a head 60 and the foot 20. The head 60 is mounted in the support bracket portion 26. The foot contacts the earth or other surface under the bicycle to support it.

Figure 8:
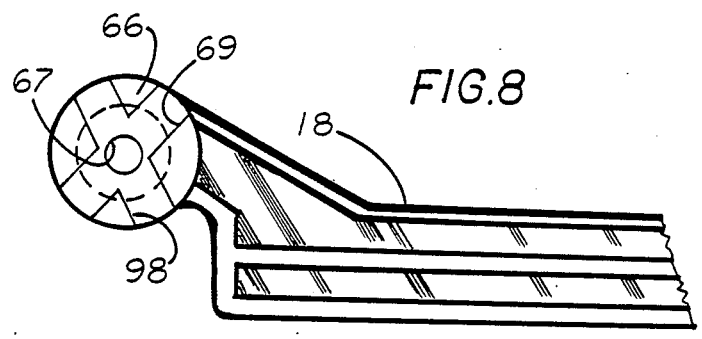
FIG. 8 illustrates an X-shaped recess formed in an end of the bicycle stand.

Referring to FIGS. 5, 6 and 8 the locking mechanism 22 includes the bracket portion 26 and the head 60 of the support member 18. The head 60 includes a generally cylindrical portion mounted to an end 64 of the support member 18. An end surface 66 of the head 60 has a recess 69 therein. The other end surface 68 of the head 60 is preferably flat. An axial passage 67, shown in FIGS. 5 and 8 extends through the head 60 for receiving a mounting bolt 70, shown in FIG. 1.

The bracket portion 26 includes a recess 74 in which the head 60 may be rotatably mounted. The recess has a generally rectangular cross section shown in FIGS. 4 and 5. The recess 74 is partially bounded by a pair of generally planar surfaces 76 and 78 that meet at a right angle in the bracket portion 26 near the recess 28. A generally flat rectangular projection 80 extends from the body of the bracket portion 26 to be at a right angle to the surface 78 and to have a surface 82 that faces the surface 76.

The projection 80 has a hole 84 therethrough, and a hole 86 passes through the surface 76 a short distance into the body of the bracket portion 26. The holes 84 and 86 are preferably axially aligned and the same diameter. When the support stand is assembled, the bolt 70 passes through the hole 84, the passage 67 and into the hole 86. The hole 86 may be threaded to receive the bolt 70, or the hole 86 may be smooth and the bolt 70 may include a self tapping threaded end portion (not shown), which is secured in the hole 86. Other methods, such as the use of an adhesive for mounting the bolt 70 in the hole 86 may be employed without departing from the scope of the present invention.

The juncture 90 of the projection 80 and the body of the bracket portion 26 is formed to permit a slight flexing of the projection 80 to widen the cavity 74. The ability of the projection to flex is a feature of the locking mechanism 22. A detent 92 extends from the surface 82 of the projection 80. When the stand 10 is in its stored position, the detent 92 is engaged in a leg 96 of the X-shaped recess 69 in the head 60. The detents 92 and 94 have beveled edges 92A and 94A so that application of a predetermined torque to the support member about the bolt 70 disengages the detent 92 and the leg 96 of the recess 69. As the head 60 begins to rotate in the recess 74, the head 60 pushes outward on the detent 92 and the projection 80. The projection then bends at the juncture 90 of the projection 80 and the body of the bracket portion 26 so that the detent becomes completely out of the recess 69. If the support member continues to rotate downward, the detent 94 becomes engaged in a leg 98 of the recess 69. The support member 18 is then in its lowered position shown in FIG. 2. The support member 18 is moved from the lowered position to the stored position by exerting sufficient torque torque about the bolt 70 to disengage the detent 94 and the recess 69 and rotating the support member until the detent 92 becomes engaged in the recess 69.

Referring to FIGS. 8 and 9, the foot 20 includes a body portion 100 and a projection 102 that extends from the body portion 100. The projection is curved to form a recess 104 in which the seat tube 11 shown) of the bicycle (13) may be received. The projection may include and end portion 106 that cooperates with the body 100 to form an opening 108 into the recess 104. This opening may have a width smaller than the diameter of the seat (11). The recess 104 is preferably formed to receive therein more than half the circumference of the seat tube (not shown) so that the projection 102 and body 100 grip the seat tube (11). If the seat tube diameter is too small to permit it to be gripped by the foot 20, then the seat tube (11) merely fits inside the recess 104 so that the support member 18 may be aligned with the seat tube (11).

Referring to FIG. 9, the foot 20 has a plurality of grippings studs 110 that project away from its lower surface. When the support member 18 is in the lowered position, the gripping studs 110 engage the surface upon which the bicycle rests to prevent the foot 20 from slipping from the position in which the user had placed it.

What is claimed is:

1. Apparatus for supporting a bicycle, comprising:
   a bicycle frame that includes a bottom bracket and a seat tube extending from the bottom bracket;
   a mounting bracket configured for connection directly to the seat tube;
   a support member extending from the mounting bracket, the support member being rotatable upon the mounting bracket between a lower position to support the bicycle and an upper position in which the support member is generally parallel to the seat tube; and
   a hinging and locking device formed in the mounting bracket and a first end of the support member, the hinging and locking device including:
   a first portion of the mounting bracket that is configured to define a recess;
   a detent extending from a portion of the mounting bracket into the recess;
   a head portion extending from a first end of the support member, the head portion including means for engaging the detent to retain the support member in either the upper or lower position; and
   a projection extending from the mounting bracket, the projection being flexibly mounted to the mounting bracket so that the detent is retained in the means for engaging the detent when the support member supports the weight of the bicycle and so that the projection bends away from the mounting bracket upon the application of sufficient torque to the support member to disengage the detent from the detent engaging means when the support member is moved between the upper and lower positions.

2. The bicycle support stand of claim 1 wherein the means for engaging the detent comprises a generally X-shaped recess in a surface of the head of the support member and wherein the projection includes a pair of detents extending from the projection into the recess in the mounting bracket for selective engagement in the X-shaped recess in the head of the support member.

3. Apparatus for supporting a bicycle that includes a seat tube and a bottom bracket, the seat tube extending from the bottom bracket to provide means for mounting a seat to the frame, comprising:
   a mounting bracket configured for connection directly to the seat tube;
   a support member extending from the mounting bracket, the support member being rotatable upon the mounting bracket between a lower position to support the bicycle and an upper position in which the support member is generally to the seat tube;
   a hinging and locking device formed in the mounting bracket and a first end of the support member, the hinging and locking device including:
   a first portion of the mounting bracket that is configured to define a recess, detent means extending from a portion of the mounting bracket into the recess;
   a head portion extending from a first end of the support member, the head portion including means for engaging the detent means to retain the support member in either the upper or lower position; and
   a foot extending from a second end of the support member, the foot including means for enclosing and gripping a portion of the seat tube when the support member is in the upper position.

4. The bicycle support stand of claim 3 wherein the locking device includes a projection extending from the support bracket, the projection being flexibly mounted to the support bracket so that the detent is retained in the detent engaging means when the support member supports the weight of the bicycle and so that the projection bends away from the support bracket upon the application of sufficient torque to the support member to disengage the detent from the detent engaging means when the support member is moved between the upper and lower positions.

5. The bicycle support stand of claim 3 wherein the foot includes at least one stud extending from a lower surface thereof to retain the foot against sliding when the support member is in the lower position.

6. The bicycle support stand of claim 5 wherein the detent engaging means comprises a generally X-shaped recess in a surface of the head of the support member and wherein the detent means includes a pair of detents extending from the projection into the recess in the mounting bracket for selective engagement in the X-shaped recess in the head of the support member.

* * * * *